Patented Nov. 19, 1929

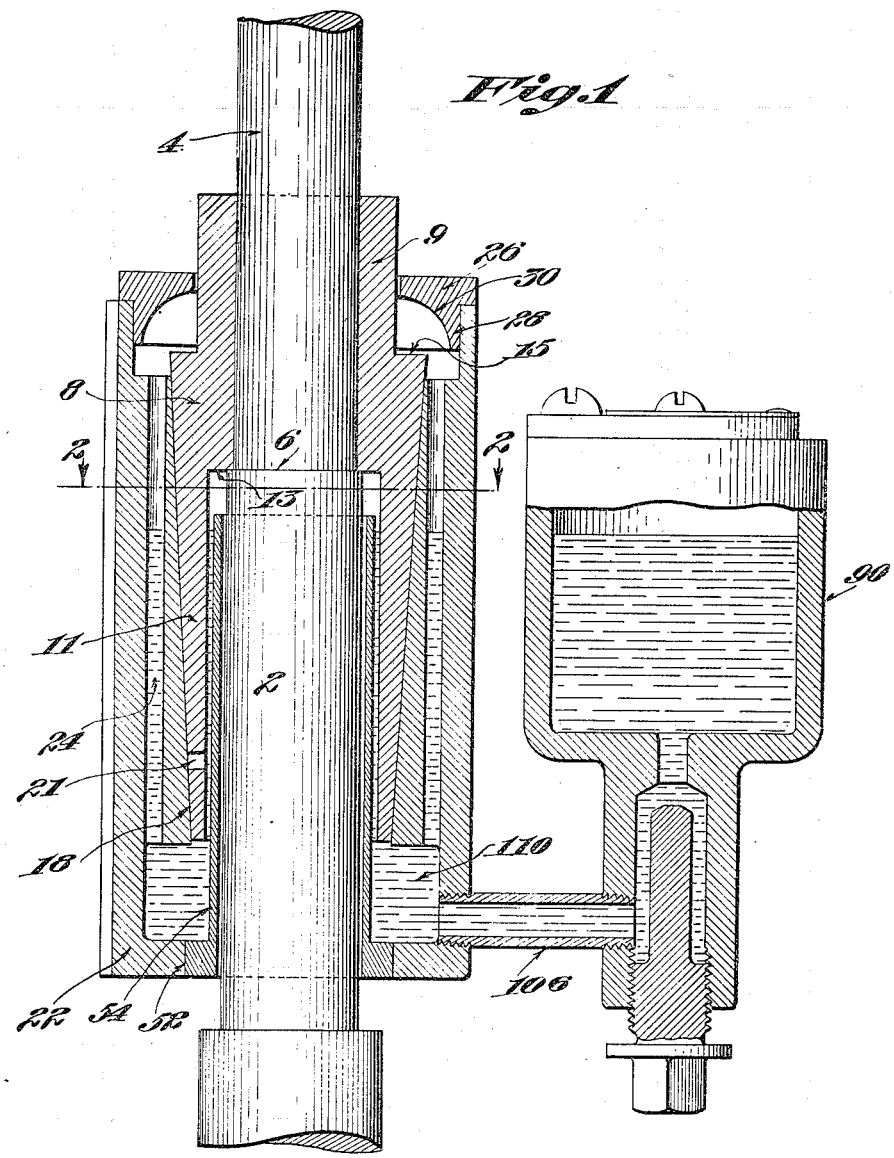

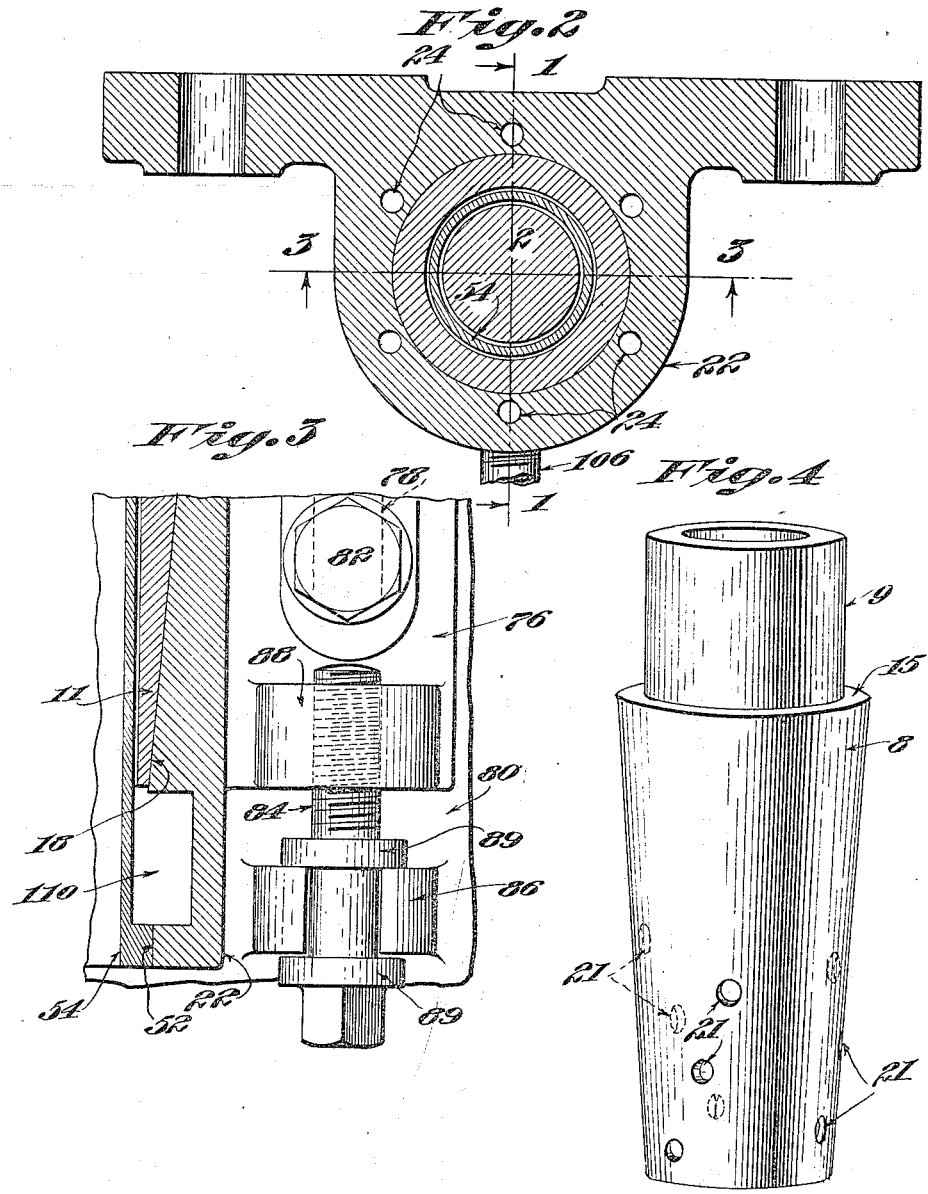

1,736,671

UNITED STATES PATENT OFFICE

WESLEY J. SHAW, OF HAVERHILL, MASSACHUSETTS, ASSIGNOR TO NEW ENGLAND WOOD HEEL CO., OF HAVERHILL, MASSACHUSETTS, A CORPORATION OF MASSACHUSETTS

BEARING

Application filed June 23, 1923. Serial No. 647,378.

The present invention relates to shaft-and-bearing structures, and more particularly to structures comprising vertically disposed shafts that extend through both ends of their bearings.

An object of the invention is to provide an improved construction of the above-described character, the bearing of which shall not leak. A further object is to simplify and cheapen the cost of manufacture.

To these and other ends, the nature of which will be made plain in the course of the following description, the invention consists of the improved shaft and bearing a preferred embodiment of which is hereinafter described, illustrated in the accompanying drawings, and defined in the appended claims.

In the accompanying drawings, Fig. 1 is a vertical section, partly in elevation, of a preferred embodiment of the present invention, the section being taken substantially upon the line 1—1 of Fig. 2, looking in the direction of the arrows; Fig. 2 is a horizontal section taken upon the line 2—2 of Fig. 1, looking in the direction of the arrows; Fig. 3 is a fragmentary vertical section taken upon the line 3—3 of Fig. 2, looking in the direction of the arrows; and Fig. 4 is a perspective view of a preferred bearing sleeve.

A preferred embodiment of the invention is shown in Fig. 1 in connection with a vertically disposed shaft having a portion 2 of relatively enlarged diameter and a portion 4 of relatively reduced diameter that are separated from each other by an annular shoulder 6. A tapered bearing sleeve 8 has an upper portion 9 that is fixed to the portion 4 of the shaft, and a lower skirt portion 11 that is spaced from the portion 2 of the shaft. The skirt portion 11 is separated from the portion 9 by an annular shoulder 13 that contacts with the shoulder 6, as shown in Fig. 1. The bearing sleeve 8 thus constitutes a tapered bearing portion for what is, in effect, a tapered shaft. The sleeve 8 may be fixed to the shaft in any desired manner, but it is preferred to force the sleeve upon the shaft with a pressed fit.

The tapered sleeve 8 bears against the walls of a tapered bore 18 of a tubular member, shown as a cup 22. The cup 22 is provided with a plurality of vertically disposed, drilled oil ports 24. During the rotation of the shaft, therefore, oil or other lubricant that is contained within the cup 22 will be caused to travel upward, by centrifugal force, between the tapered sleeve 8 and the walls of the bore 18, and then downward, through the oil ports 24, back to the bottom of the cup 22. The centrifugal action may be aided by a plurality of holes 21 arranged upon the skirt 11 of the bearing sleeve 8 in staggered relation, as shown more particularly in Fig. 4, but it is understood that the use of the holes 21 is not essential to the carrying out of the present invention. This circulation of the oil is continued so long as the shaft rotates, which assures the presence of a film of oil between the bearing sleeve 8 and the walls of the bore 18 during the rotation of the shaft.

An annular dust cap or cover 26 is mounted at the top of the cup 22 to keep dirt and other impurities from the bearing parts and the oil. The dust cap is provided with a depending flange 28 that contacts snugly against the inner wall of the cup 22, and it extends very close to the rotating shaft 4. The dust cap 26 is cut away near the oil ports 24, as shown at 30, in order not to interfere with the free circulation of the oil heretofore described.

The bearing sleeve 8 is preferably of steel, and the cup 22 of bronze. The wear will therefore take place in the bronze cup 22, and may be compensated for, from time to time, by vertically adjusting the cup 22, without affecting the position of the shaft. To this end, the cup is integrally cast with ears 76 that are provided with vertically elongated openings 78 whereby it may be secured in vertically adjusted position upon a frame 80 by means of bolts 82. Vertical adjustment may be effected by a screw 84 that is mounted between the arms of a forked lug 86 of the frame 80 and that is threaded into a lug 88 that is integral with one of the ears 76. Vertical movement of the screw 84 is prevented by integral flanges 89 between which the lug 88 is received. Rotative movement of the screw 84 in one or the other direction will therefore result in raising and lowering the cup 22.

An oil cup 90 is connected to the cup 22 by a pipe 106 through which oil may pass from the oil cup 90 to the cup 22. The pipe is connected to an annular oil chamber 110 at the bottom of the cup 22.

The bottom wall of the cup 22 is provided with an opening 52 within which is pressed or otherwise fixed, with an oil-tight fit, a tube 54 that extends upward into the cup along the walls of the opening, into the space between the skirt 11 of the sleeve 8 and the portion 2 of the shaft. The portion 2 of the shaft extends into the cup 22 through the tube 54 without engaging the same. The tube 54 is in the nature of a tubular flange that extends above the oil level in the cup 22, thus preventing the escape of oil from the cup 22 along the portion 2 of the shaft, though the oil travels between the bearing and the shaft, as before described, to a height above the top of the tube 54.

Many modifications will occur to persons skilled in the art, and all such are considered to fall within the spirit and scope of the invention as defined in the appended claims.

What is claimed is:

1. A device of the class described having, in combination, a frame, a vertically disposed, one piece cup constituted of comparatively soft metal the interior side walls of which are tapered to constitute a tapered bearing and the bottom wall of which is provided with an opening, the bottom of the cup below the tapered bearing being reamed out to produce an oil reservoir integral with the body of the cup, a separate tubular flange secured within the opening with a lubricant-tight fit and extending upward into the cup above the oil level in the cup, a vertically disposed shaft extending into the cup through the flange, a tapered sleeve constituted of comparatively hard metal permanently fixed to the shaft and bearing against the said tapered bearing, there being a space between the shaft and the sleeve into which the flange extends, the cup being provided with ports extending from the oil reservoir integrally upward into the body of the cup, whereby a lubricant contained in the cup is adapted, during the rotation of the shaft, to travel upward between the tapered sleeve and the walls of the tapered bearing to a height above the top of the flange without leaking out of the cup over the top of the flange, and then, through the ports, back to the bottom of the cup, and means for vertically adjusting the cup on the frame to compensate for the wear of the comparatively soft-metal tapered bearing.

2. A device of the class described having, in combination, a frame, a vertically disposed, one piece cup constituted of comparatively soft metal the interior side walls of which are tapered to constitute a tapered bearing and the bottom wall of which is provided with an opening, the bottom of the cup below the tapered bearing being reamed out to produce an oil reservoir integral with the body of the cup, a separate tubular flange secured within the opening with a lubricant-tight fit and extending upward into the cup above the oil level in the cup, a vertically disposed shaft extending into the cup through the flange and having a lower portion of relatively enlarged diameter and an upper portion of relatively reduced diameter that are separated from each other by an annular shoulder, a tapered sleeve the upper portion of which is permanently secured to the upper portion of the shaft and the lower portion of which is spaced from the shaft, the lower portion of the sleeve being separated from the upper portion of the shaft by an annular shoulder that contacts with the annular shoulder of the shaft, the sleeve being forced upon the shaft with a pressed fit, the tapered sleeve being constituted of comparatively hard metal and bearing against the said tapered bearing, the cup being provided with ports extending from the oil reservoir integrally upward into the body of the cup, whereby a lubricant contained in the cup is adapted, during the rotation of the shaft, to travel upward between the tapered sleeve and the walls of the tapered bearing and then, through the ports, back to the bottom of the cup, and the flange extending upward into the space provided between the shaft and the tapered sleeve to prevent escape of the lubricant from the cup, and means for vertically adjusting the cup on the frame to compensate for the wear of the comparatively soft-metal tapered bearing.

In testimony whereof, I have hereunto subscribed my name this 19th day of June, 1923.

WESLEY J. SHAW.